United States Patent

Ummen et al.

[11] 4,070,919
[45] Jan. 31, 1978

[54] BELT DRIVE SYSTEM

[75] Inventors: Arnulf Ummen; Alexander Muller, both of Hoxter, Germany

[73] Assignee: Arntz-Optibelt-KG, Hoxter, Germany

[21] Appl. No.: 687,173

[22] Filed: May 17, 1976

[30] Foreign Application Priority Data

May 17, 1975 Germany .............................. 2522183

[51] Int. Cl.² .............................................. F16G 5/20
[52] U.S. Cl. ........................................ 74/229; 74/234; 74/237
[58] Field of Search .................. 74/234, 233, 229, 237

[56] References Cited

U.S. PATENT DOCUMENTS

| 2,472,513 | 6/1949 | Bergquist | 74/229 |
| 2,718,790 | 9/1955 | Aughey | 74/229 |
| 3,948,113 | 4/1976 | Stork | 74/237 X |

Primary Examiner—Alan Cohan
Attorney, Agent, or Firm—Mason, Mason & Albright

[57] ABSTRACT

A belt drive system comprises a drive belt extending between driving and driven shafts. The belt has a flat part, and a rib extending from one surface of the flat part into an annular groove formed in each of the shafts. The grooves are of complementary cross-section to that of the rib, but are wider than the rib so that during operation of the drive system, one side only of the rib engages the adjacent side of the grooves, and the other side of the rib is spaced from the adjacent side of the grooves.

2 Claims, 1 Drawing Figure

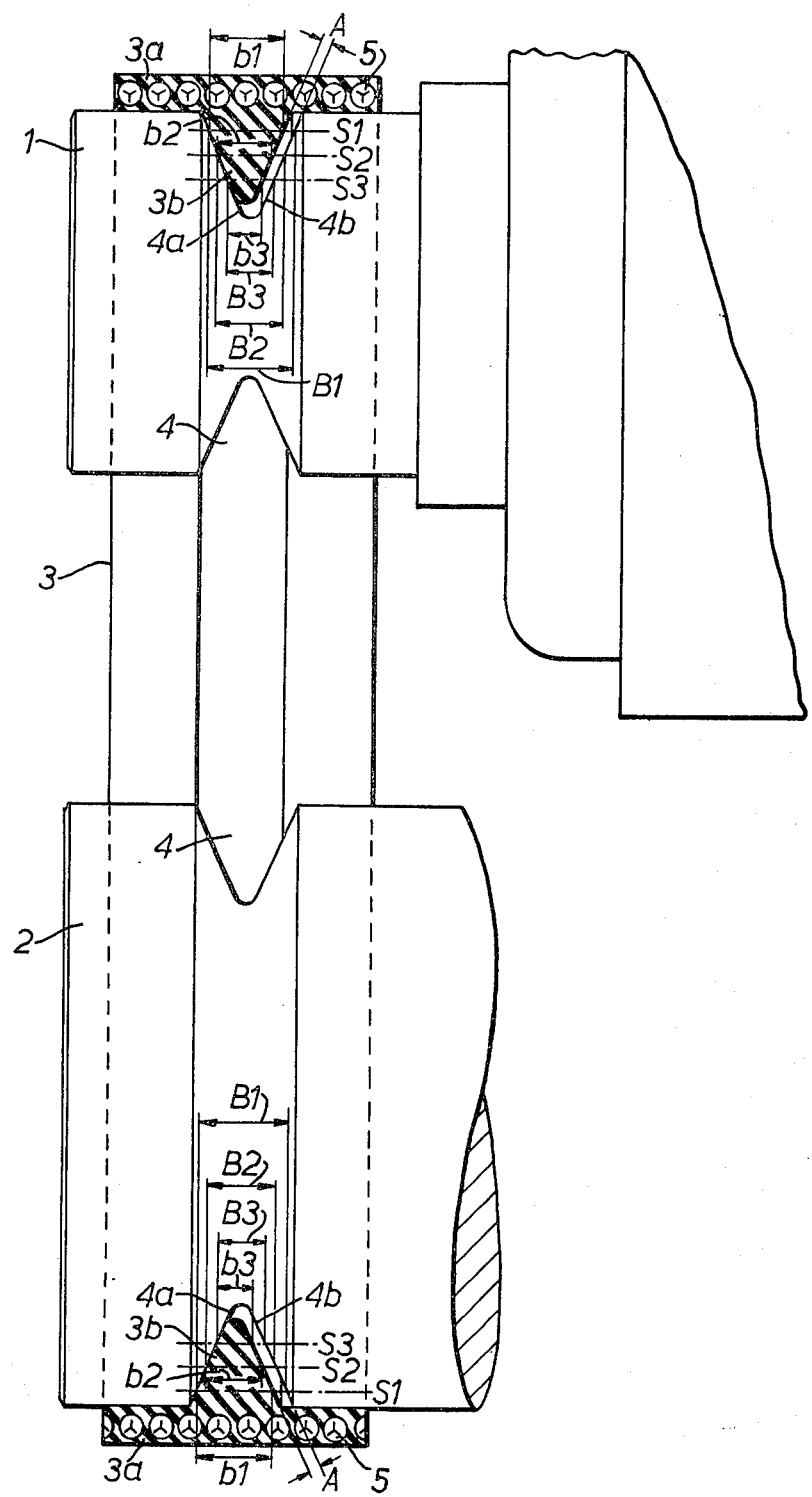

BELT DRIVE SYSTEM

BACKGROUND OF THE INVENTION

1. Field of the Invention

The present invention relates to belt drive systems.

2. Description of the Prior Art

Belt drive systems have been proposed comprising a flat belt which has a one-layer helically wound cord as a tension element. During operation of such a system, the belt tends to move in an axial direction and thus to free itself from the pulleys, shafts or the like over which it passes. This axial movement can be prevented by the use of convex driving pulleys, driving shafts and the like, of which the manufacture, however, is fairly costly. They also have the disadvantage that the convexity of the pulley gives rise to different peripheral speeds, which in turn involve forced slipping movements of the driving belt and internal tensions in the belt body. Restriction of the axial movement can be effected by the use of edge discs on the shafts, but this, on the other hand, is disadvantageous because there is continuous friction between the side of the driving belt and the side of the disc, and this can produce premature damage to the tension element, particularly in the case of flat belts of which the sides are not specially protected.

Belt drive systems have also been proposed in which the belt consists of a flat belt part with a helically wound tension element and tooth-shaped transverse ribs arranged on the contact side, which engage in correspondingly formed slots in the shafts, pulleys and the like to produce a positive connection. Such belts also produce an axial movement which is likewise usually restricted by the use of a costly edge disc arrangement. Belts having a flat belt part with a helically wound tension element, and wedge-shaped ribs arranged on the contact side, have also been proposed. In such a belt, each side of each rib contacts the sides of corresponding wedge-shaped grooves of the pulleys, shafts and the like, and this belt has the disadvantage that the rib angle must be adjusted to the coefficient of friction that is present in each case, in order to prevent self-locking and consequent premature destruction. On the other hand, because of their multiple groove and therefore multiple rib design, such drive systems require a particularly precise adjustment in respect of their groove and belt spacing, and their manufacture is correspondingly costly. Further, this belt is particularly disadvantageous as regards the action of foreign bodies, because foreign bodies up to a certain particle size that have fallen into the drive system, will fall out of the system only under favourable conditions, and in cases of jamming between the wedge-shaped ribs, premature destruction of the belt can occur.

SUMMARY OF THE INVENTION

According to the present invention, there is provided in a belt drive system, a rotating driving element having an annular groove, a rotating driven element having an annular groove, and a drive belt extending between the driving and driven elements to transmit a driving force from the driving element to the driven element, said belt comprising a flat belt part, a helically wound tension element, and a rib engaged in the annular groove, the rib having a width measured in several planes parallel to the flat belt part which is uniformly smaller than the width of the grooves when measured in said planes, whereby during operation of the system, one side of the rib engages an adjacent side of the grooves and the other side of the rib is spaced from the adjacent side of the grooves by the same distance at the level of each of said planes.

BRIEF DESCRIPTION OF THE DRAWING

An embodiment of the invention will now be described, by way of example only, with reference to the accompanying diagrammatic drawings, the sole FIGURE of which shows, partially in section, a belt drive system in accordance with the invention.

DESCRIPTION OF THE PREFERRED EMBODIMENT

The drive system shown in the drawing comprises a driving shaft 1, powered by means of an electric motor for example, a driven shaft 2, and a drive-transmitting belt 3 extending between the shafts 1 and 2. Grooves 4 having two sides 4a and 4b are formed in the two shafts 1 and 2. In the embodiment illustrated the grooves 4 are wedge-shaped or V-shaped in section; however, the grooves 4 may be of other section, such as rectangular, or semicircular.

In the embodiment illustrated the belt 3 consists of a flat belt part 3a and a rib 3b which is of corresponding section to that of the grooves 4. In the flat belt part 3a which consists of a suitable elastomer, a tension element 5 is provided which consists of a helically wound cord.

The width, $b_1$, $b_2$, $b_3$, of the rib 3b measured in different planes, $S_1$, $S_2$, $S_3$ parallel to the plane of the belt part 3a is uniformly smaller than the width, $B_1$, $B_2$, $B_3$, of the annular groove 4 measured in the planes $S_1$, $S_2$, $S_3$, whereby during operation of the drive system, one side of the rib 3b, for instance the side on the left in the drawing, bears against the adjacent side 4a of the groove 4, whereas the other side of the rib 3b is spaced by a constant distance A from the adjacent side 4b of the groove 4 in each plane $S_1$, $S_2$, $S_3$. The spacing A thus produced, which is preferably about 2 to 10% of the maximum width of the rib 3b, prevents self-locking of the belt. In the case of reversible drive systems the spacing A also ensures an equally satisfactory formation of the surfaces of contact between appropriate sides of the rib and groove.

As can be seen from the drawing, for power transmission in an enveloping drive system, normally the face of the belt which carries the rib is used as the contact surface of the belt, so that when this extends round shafts or pulleys, two contact surfaces extending in a longitudinal direction become effective, and during operation one side of the rib additionally comes into frictional contact with the corresponding side of the groove. In this operating position the opposite side of the rib is not in frictional contact with the side of the associated groove.

By means of the drive system particularly described, it is possible to dispense with the convex construction of the shafts, pulleys and the like having a relatively small diameter and with the edge discs, and the belt can be formed from materials with an extremely high coefficient of friction, for instance polyurethane, without any need to take into consideration the particularly critical danger of self-locking that is usually associated with belts composed of high coefficient of friction materials. Also the axial thrust released by the helically wound tension layer is used to press one side of the rib against the adjacent side of the groove for the transmission of driving forces.

In view of the absence of a possible self-locking action, the shape of the groove and of the rib engaging in this groove can therefore be optimally adjusted to the properties of the material and the driving conditions in each case.

It is possible to transmit comparatively large power outputs without any need for special transmission pulleys on the driving and driven shafts for this purpose. The driving force is transmitted from the contact surfaces of the flat belt and one side of the rib of the belt to the cylindrical shaft surface and the associated side of the groove.

The belt drive system particularly described can be used in domestic appliances, for instance domestic washing machines or kitchen appliances, in powered vehicles and for other applications in which large power outputs are to be transmitted by drives having shafts or pulleys of which the diameter is relatively small; the diameter can be smaller than 20 mm.

We claim:

1. In a belt drive system, a rotating driving element having an annular groove, a rotating driven element having an annular groove, and a drive belt extending between the driving and driven elements to transmit a driving force from the driving element to the driven element, said belt comprising a flat belt part, a helically wound tension element, and a rib engaged in the annular grooves, the rib having a width measured in several planes parallel to the flat belt part which is smaller by a constant distance than the width of the grooves when measured in said planes, whereby during operation of the system, one side of the rib engages an adjacent side of the grooves and the other side of the rib is spaced from the adjacent side of the grooves by the same distance at the level of each of said planes.

2. In a belt drive system, a rotating driving element having an annular groove, a rotating driven element having an annular groove, and a drive-transmitting belt extending between the driving and driven elements, said belt comprising a substantially flat belt part, a tension element embedded in the belt, and a rib projecting from the flat belt part and engaged in the annular grooves, said grooves having a complementary cross-section to that of the rib, the width of the rib being smaller than that of the groove by a constant distance at all positions along the height of the rib.

* * * * *